(12) United States Patent
Delgado et al.

(10) Patent No.: US 9,823,002 B1
(45) Date of Patent: Nov. 21, 2017

(54) SYSTEM TO COOL BEVERAGES USING A REFRIGERATION SYSTEM HAVING A DEFROSTING FEATURE

(71) Applicants: Jorge Delgado, Hialeah, FL (US); Raul Monzon De Leon, West Palm Beach, FL (US)

(72) Inventors: Jorge Delgado, Hialeah, FL (US); Raul Monzon De Leon, West Palm Beach, FL (US)

(*) Notice: Subject to any disclaimer, the term of this patent is extended or adjusted under 35 U.S.C. 154(b) by 0 days.

(21) Appl. No.: 15/408,912

(22) Filed: Jan. 18, 2017

(51) Int. Cl.
*F25B 47/02* (2006.01)
*F25D 31/00* (2006.01)

(52) U.S. Cl.
CPC .......... *F25B 47/025* (2013.01); *F25D 31/007* (2013.01); *F25D 31/008* (2013.01); *F25B 2341/061* (2013.01); *F25B 2700/21151* (2013.01)

(58) Field of Classification Search
CPC .......... F24F 1/025; F25D 16/00; F25D 17/02; F25B 49/027
USPC ................................................ 62/196.4, 261
See application file for complete search history.

(56) References Cited

U.S. PATENT DOCUMENTS

| 4,191,024 A * | 3/1980 | Machida | F25B 5/00 62/155 |
|---|---|---|---|
| 4,576,011 A * | 3/1986 | Glamm | F25B 41/06 62/115 |
| 4,949,552 A * | 8/1990 | Adams | B67D 1/0867 62/196.4 |
| 8,347,646 B1 * | 1/2013 | Abraham, III | F25D 31/007 222/146.6 |
| 2002/0069653 A1* | 6/2002 | Goodchild | B01D 5/0039 62/188 |
| 2008/0092578 A1* | 4/2008 | Yeagy | F25D 31/003 62/261 |
| 2008/0098762 A1* | 5/2008 | Kent | F25D 17/02 62/258 |

\* cited by examiner

*Primary Examiner* — Emmanuel Duke
(74) *Attorney, Agent, or Firm* — Sanchelima & Associates, P.A.; Christian Sanchelima; Jesus Sanchelima

(57) ABSTRACT

The present disclosure discloses a liquid cooler having separable and portable components. The liquid cooler has a liquid cooling section and a refrigerating system section. In an operative liquid cooling configuration, the components present in the liquid cooling section and the refrigerating system section are connected with each other with a first and second releasing coupler. In an operative defrosting configuration, the components of present in the liquid cooling section and the refrigerating system section are separated with each other by releasing the first and second releasing coupler and hence are easily portable. The separated liquid cooling section and the refrigerating system section enables easy periodic maintenance or replacement of faulty components in less time, labor and cost. Further, the liquid cooler is powered by power received from power mains or by power storage device such as battery.

13 Claims, 6 Drawing Sheets

SYSTEM TO COOL BEVERAGES USING A REFRIGERATION SYSTEM HAVING A DEFROSTING FEATURE

FIELD OF INVENTION

The present disclosure generally relates to a liquid cooler for cooling at least one beverage. Moreover, the present disclosure relates to a liquid cooler having separable and portable components.

BACKGROUND

Liquid coolers dispense cold liquids such as water or different types of beverages. Typically, each conventional liquid cooler comprises an enclosure which encloses a refrigeration system having an evaporator, a compressor, a condenser and an expansion valve. The enclosure also encloses liquid which is in thermal connection with the refrigerant passing through the coils of the evaporator. The refrigerant absorbs heat from liquid thereby cooling liquid which can be dispensed out of the liquid cooler. In course of operation, due to refrigerant, which is evaporating at low temperature, froth gets accumulated on the coils, thereby reducing the efficiency of the refrigerating system. Thus, periodical maintenance of the evaporator is required. As the refrigeration system and liquid to be cooled are enclosed in one enclosure, the periodical maintenance or replacement of components, in case of failure of the components, of the refrigeration system becomes a cumbersome and time consuming task and also requires more labors to handle the heavy weight enclosure thus increasing the periodical maintenance/replacement cost. Therefore, there is a need for a liquid cooler to cool beverages, the components of which can be easily maintained, consumes less time, require less labors and thus is cost effective.

SUMMARY

The above-mentioned problems are addressed by providing a liquid cooler having separable and portable components.

In accordance with one embodiment of the present disclosure, the liquid cooler cools liquid such as water or beverages. The liquid cooler comprises a liquid cooling section and a refrigerating system section. The liquid cooling section mainly comprises a bar, a divider disposed within the bar to form a refrigerant inlet pipe and a refrigerant outlet pipe and at least one liquid holder which is surrounded by the refrigerant inlet pipe and the refrigerant outlet pipe. The refrigerating section mainly comprises an evaporator, a compressor, a reversing valve, a condenser and an expansion valve. Refrigerant is circulated in the components of the refrigeration system, the refrigerant inlet pipe and the refrigerant outlet pipe.

In one aspect of the present disclosure, the liquid cooler is in an operative liquid cooling configuration. In the operative liquid cooling configuration, one end of each of the refrigerant inlet pipe and the refrigerant outlet pipe are connected to the evaporator with a first releasable coupler and a second releasable coupler respectively thereby connecting the liquid cooling section and the refrigerating system section. During cooling operation, refrigerant flows in the liquid cooling section as well as the refrigerating system section. The refrigerant circulates from the refrigerant system to the refrigerant inlet pipe, the refrigerant outlet pipe and back to the refrigerant system. The passing of refrigerant from the refrigerant inlet pipe and the refrigerant outlet pipe causes thermal connection with liquid contained in the at least one liquid holder resulting in cooling of liquid.

In another aspect of the present disclosure, the liquid cooler is in an operative defrosting configuration. In the operative defrosting configuration, the refrigerant inlet pipe and the refrigerant outlet pipe are separated from the evaporator by releasing the first and second releasable coupler respectively thereby separating the liquid cooling section from the refrigerating system section. During defrosting operation, refrigerant circulates only in the refrigeration system: from the compressor to the evaporator (that acts as a condenser), further to the condenser (that acts as an evaporator) and back to the compressor resulting in defrosting of frost accumulated on the coils of the evaporator. As defrosting is carried out only in the refrigerating system section, handling only the refrigerating system section is easy, requires less time and less labor to handle less weight as compared to conventional enclosure of liquid coolers that houses the refrigeration system and liquid to be cooled together.

In one aspect of the present disclosure, the liquid cooler can be actuated by power received from power mains and in case of power failure from the power mains the liquid cooler is powered by power stored in power storage device such as a battery.

The features and advantages described in this summary and in the following detailed description are not all-inclusive, and particularly, many additional features and advantages will be apparent to one of ordinary skill in the relevant art, in view of the drawings, and specification thereof. Moreover, it should be noted that the language used in the specification has been principally selected for readability and instructional purposes, and may not have been selected to delineate or circumscribe the inventive subject matter.

BRIEF DESCRIPTION OF DRAWINGS

In the following drawings, like reference numbers are used to refer to like elements. Although the following figures depict various examples of the invention, the invention is not limited to the examples depicted in the figures.

FIG. 1b illustrates another schematic representation of the liquid cooler of FIG. 1a;

FIG. 1c illustrates a schematic perspective view of the liquid cooling section of FIG. 1a;

DETAILED DESCRIPTION

The following detailed description is intended to provide example implementations to one of ordinary skill in the art, and is not intended to limit the invention to the explicit disclosure, as one or ordinary skill in the art will understand that variations can be substituted that are within the scope of the invention as described.

The present disclosure discloses a liquid cooler in accordance with one embodiment of the present disclosure. The liquid cooler is used to cool liquid(s) such as water or beverages. The liquid cooler comprises a liquid cooling section and a refrigerating system section. The liquid cooler operates in an operative cooling configuration and an operative defrosting configuration. In the operative cooling configuration, the liquid cooling section and the refrigerating system section are connected with one another establishing a thermal connection between the refrigerant of the refrigerating system and liquid present in the liquid cooling section which enables cooling of liquid. In operative defrosting configuration, the liquid cooling section and the refrigerating system section are separated from one another disconnecting thermal connection between liquid and refrigerant and refrigerant is circulated only in the refrigeration system for defrosting the refrigerating system. As the refrigerating system section and the liquid cooling section are separable from one another, periodical maintenance or replacement of the components of the refrigeration system is easy because the refrigeration system section only needs to be handled which is light in weight as compared to the enclosures of conventional liquid coolers and thus requires less labor and less time leading to a cost effective process. The various features and embodiments of the liquid cooler are explained in conjunction with the description of FIGS. 1a-4.

Figure 1A:
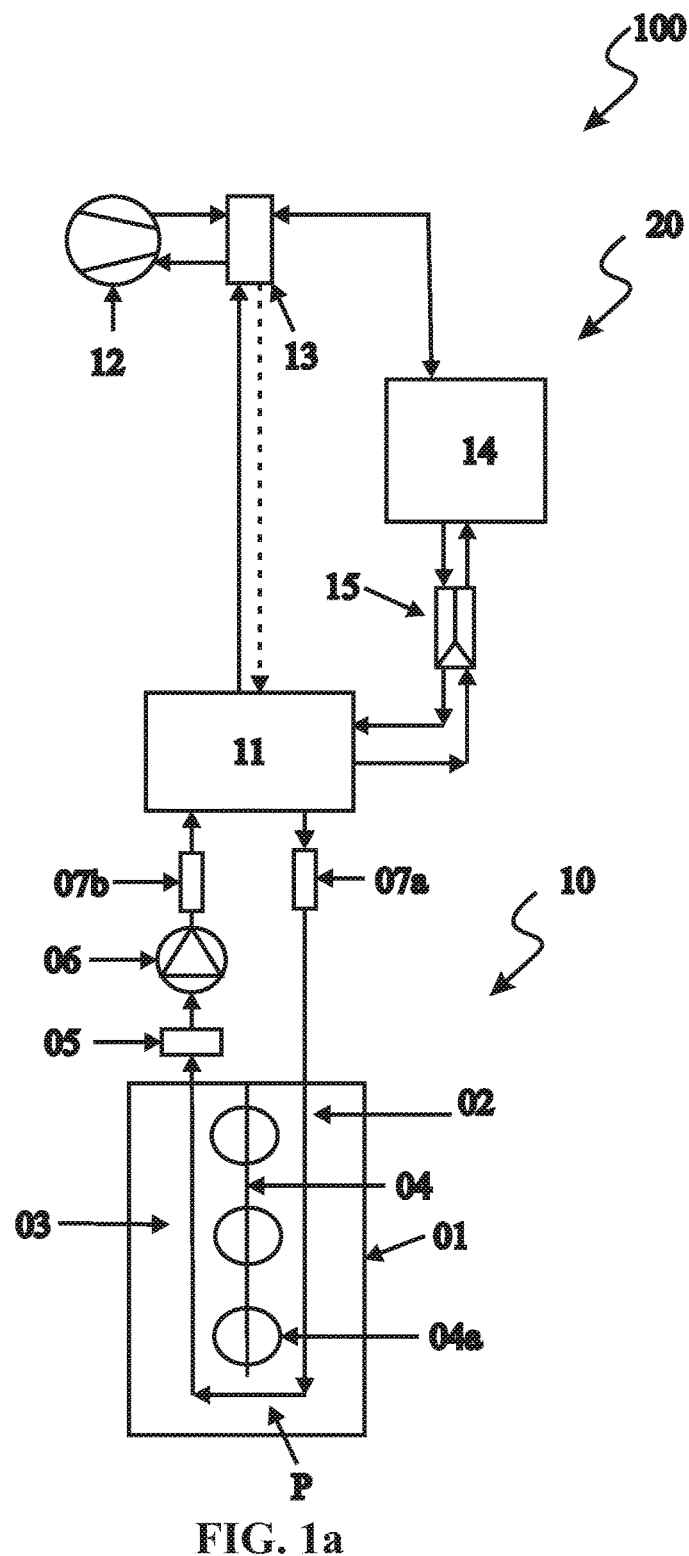
FIG. 1a illustrates a schematic representation of a liquid cooler comprising a liquid cooling section and a refrigerating system section, in accordance with one embodiment of the present disclosure.
Figure 1B:
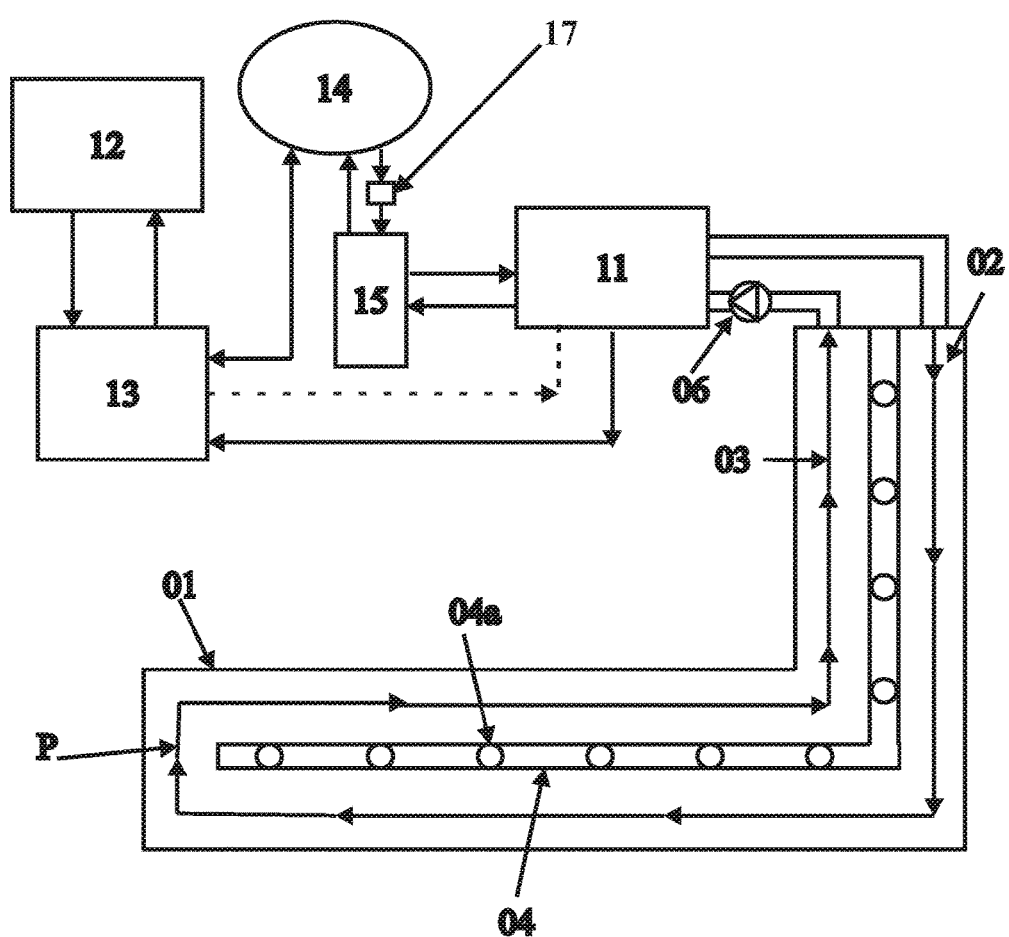
Figure 1C:
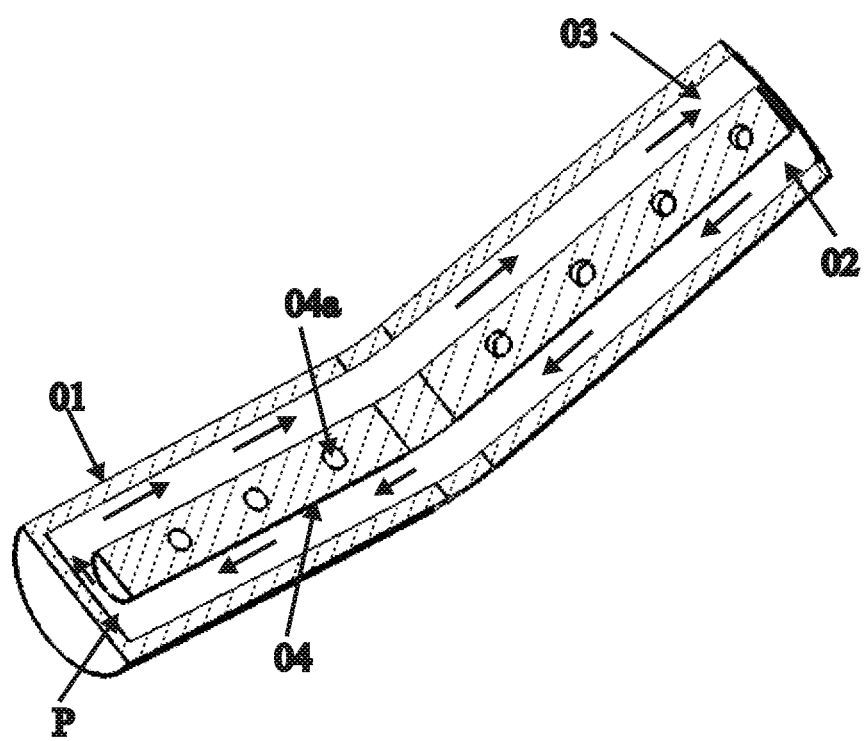

FIG. 1a and FIG. 1b illustrate a schematic representation of a liquid cooler 100, in accordance with one embodiment of the present disclosure. The liquid cooler 100 is used to cool liquid(s) like water, different types of beverages or like liquids. The liquid cooler 100 comprises a liquid cooling section 10 and a refrigerating system section 20.

Figure 2A:
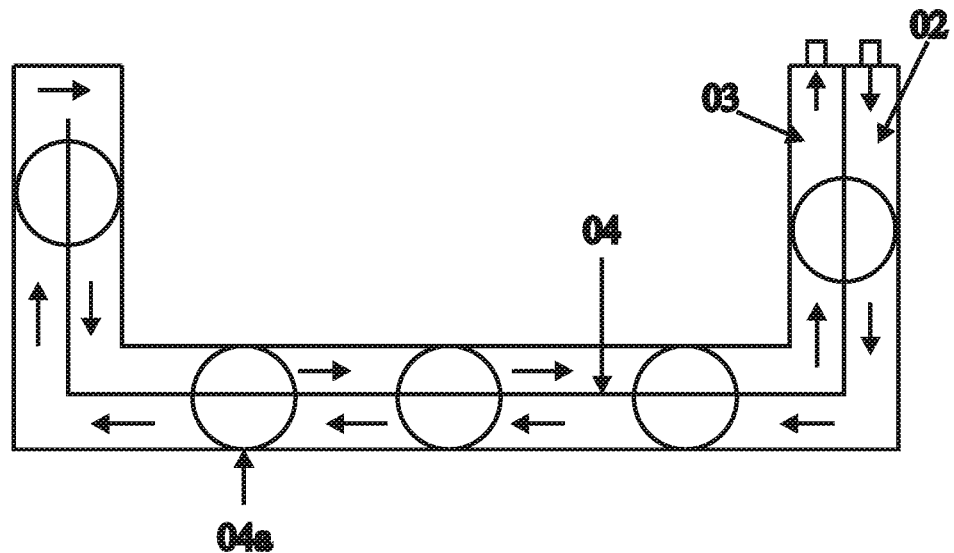
FIG. 2a illustrates a schematic representation of flow of refrigerant in a bar, of the liquid cooling section of FIGS. 1a and 1b, with a divider disposed within the bar.
Figure 2B:
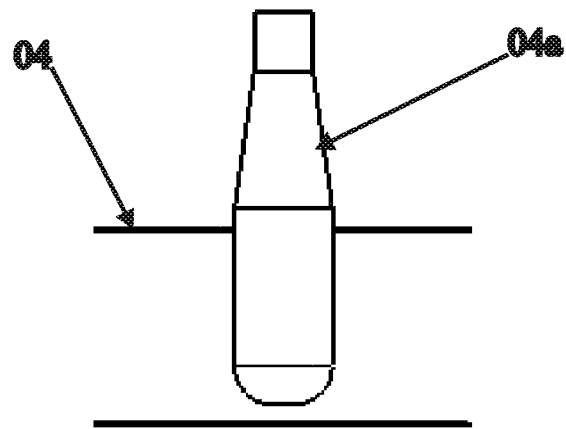
FIG. 2b illustrates a schematic representation of the divider of FIG. 2a, holding at least one liquid holder.

Referring to FIG. 1a, FIG. 1b and FIG. 2a, the liquid cooling section 10 mainly comprises a bar 01, a refrigerant inlet pipe 02 and a refrigerant outlet pipe 03 formed within the bar 01 by the divider 04 disposed therewithin and at least one liquid holder 04a. More specifically and as clearly illustrated in FIG. 1c, the divider 04 disposed within the bar 01 divides the bar 01 into the refrigerant inlet pipe 02 and the refrigerant outlet pipe 03 to form a refrigerant flow path (also termed as flow channel). The refrigerant inlet pipe 02 receives refrigerant from the refrigerating system section 20 and the refrigerant outlet pipe 03 directs the refrigerant to the refrigerating system section 20, through a pumping device 06. As illustrated in FIG. 2b, the divider 04 accommodates at least one liquid holder 04a containing liquid to be cooled therewithin. Liquid in the at least one liquid holder 04a is in thermal connection with refrigerant flowing through the refrigerant inlet pipe 02 and the refrigerant outlet pipe 03.

The refrigerating system section 20 comprises the refrigeration system which includes five major components: an evaporator 11, a compressor 12, a reversing valve 13, a condenser 14 and an expansion valve 15. Optionally, filter dryer 17 shown in FIG. 1b can be included to prevent debris from entering the system. Refrigerant is circulated in the components of the refrigeration system. Typically, the evaporator 11 and the condenser 14 can be fin-tube with forced air circulation or water-to-refrigerant comprising two tubes, one within the other. However, this is not to be construed as limiting the present disclosure as any suitable evaporator or condenser may be used. The outlet of the evaporator 11 is connected to the inlet of the compressor 12 through a recirculating pumping device (not illustrated in Figures). The outlet of the compressor 12 is connected to the inlet of the condenser 14 and is also connected to the evaporator 11 through the reversing valve 13 that reverses flow of refrigerant from the compressor 12 to the condenser 14 or from the compressor 12 to the evaporator 11. Typically, the compressor 12 can be one of the types: reciprocating (piston-cylinder), rotary, scroll, screw and centrifugal. The outlet of the condenser 14 is connected to the inlet of the expansion valve 15. The outlet of the expansion valve 15 is connected to the inlet of the evaporator 11. The expansion valve 15 is provided to regulate the rate of refrigerant into evaporator 11 in the exact proportion to the rate of evaporation of the refrigerant in evaporator 11. The evaporator 11 is also separably connected to the refrigerant inlet pipe 02 by a first releasing coupler 07a and the refrigerant outlet pipe 03 by a second releasing coupler 07b. The first releasing coupler 07a and the second releasing coupler 07b are quick releasable couplings.

In one aspect, a control system (not illustrated in Figures) which mainly comprises a controller and at least one sensor such as refrigerant temperature determining sensor, typically temperature sensor 05, and/or refrigerant pressure determining sensors for controlling functionalities of various components of the refrigeration system. The requirement of sensors depends on the need for automating the system. Typically, the refrigerant temperature sensor(s) may be a thermistor, an RTC, or a thermocouple. However, this is not to be construed as limiting the present invention as any suitable temperature sensing mechanism may be utilized.

Figure 3:
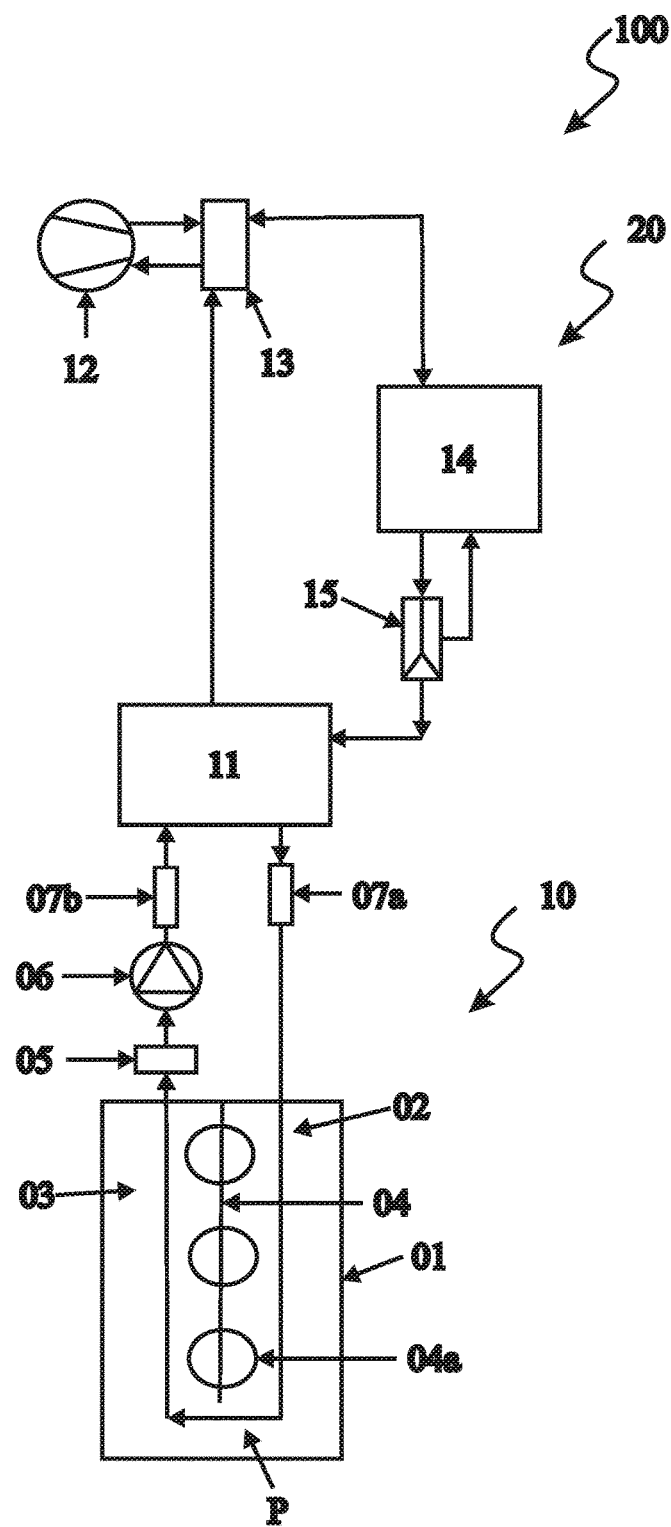
FIG. 3 illustrates a schematic representation of the liquid cooler of FIGS. 1a and 1b in which a connection is established between the liquid cooling section and the refrigerating system section defining an operative liquid cooling configuration, in accordance with one exemplary embodiment of the present disclosure.

The present disclosure discloses the method for cooling liquid in the liquid cooler 100. FIG. 3 illustrates a schematic representation of the liquid cooler 100 depicting the operative liquid cooling configuration. In the operative liquid cooling configuration, the evaporator 11 is connected to the refrigerant inlet pipe 02 by the first releasing coupler 07a and the refrigerant outlet pipe 03 by the second releasing coupler 07b. The reversing valve 13 is actuated so that a first flow path is established between the compressor 12 and condenser 14. Thenafter, the liquid cooler 100 is actuated. On actuation, the evaporator 11 releases super-cooled liquid refrigerant to the refrigerant inlet pipe 02 which is then directed to the refrigerant outlet pipe 03. As super-cooled liquid refrigerant progresses from the refrigerant inlet pipe 02 to the refrigerant outlet pipe 03, thermal connection between liquid in the at least one liquid holder 04a and super-cooled liquid refrigerant is established resulting in dissipation of heat of liquid thereby cooling liquid. Super-cooled liquid refrigerant absorbs the dissipated heat and gets converted to refrigerant gases. Refrigerant gases, of predetermined temperature sensed by the temperature sensor 05, are pumped by the pumping device 06 to the compressor 12 wherein the pressure of refrigerant gases is increased resulting in pressurized hot refrigerant gases. Pressurized hot refrigerant gases are directed to the condenser 14 through the reversing valve 13. In the condenser 14, pressurized hot refrigerant gases get condensed to form pressurized cold liquid refrigerant. Pressurized cold liquid refrigerant is directed to the expansion valve 15 wherein the pressurized cold liquid refrigerant gets converted into super-cooled liquid refrigerant. Super-cooled liquid refrigerant is then directed to the evaporator 11 for beginning the next refrigeration cycle.

Figure 4:
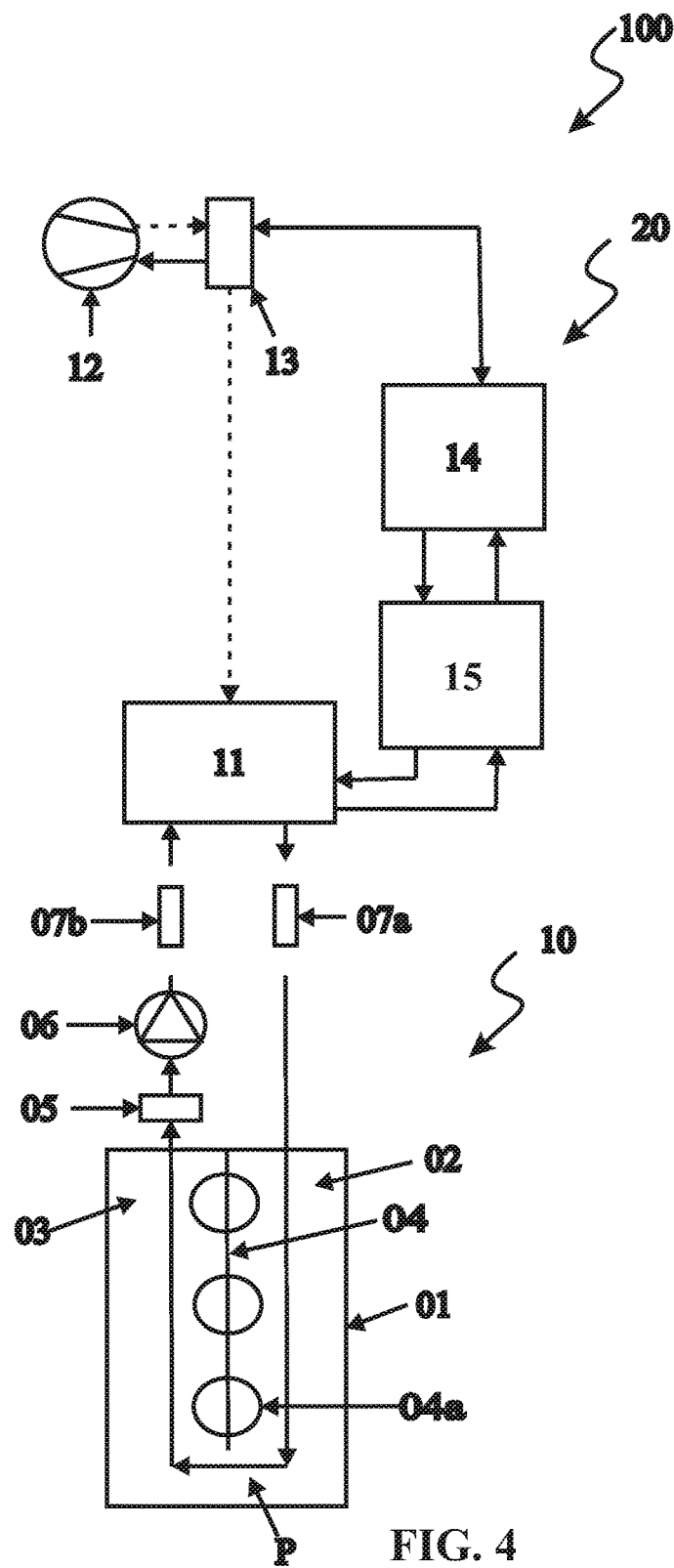
FIG. 4 illustrates a schematic representation of the liquid cooler of FIG. 1a and FIG. 1b in which the liquid cooling section and the refrigerating system are separated from one another defining an operative defrosting configuration, in accordance with one exemplary embodiment of the present disclosure.

In course of operation, froth (not illustrated in Figures) gets accumulated on the coils (not illustrated in Figures) of the evaporator 11 and hence there is a need for periodical maintenance for removing the accumulated froth. The present disclosure also discloses the method for defrosting the refrigeration system. FIG. 4 illustrates a schematic representation of the liquid cooler 100 in which the liquid cooling section 10 and the refrigerating system section 20 are separated from each other and defines an operative defrosting configuration. For defrosting, the liquid cooler 100 and pump 06 are turned-off and the evaporator 11 is separated from the refrigerant inlet pipe 02 and the refrigerant outlet pipe 03 by releasing the first releasing coupler 07a and the second releasing coupler 07b respectively. The reversing valve 13 is actuated so that a second refrigerant flow path is established between the compressor 12 and the evaporator 13. Thenafter, the refrigeration system is actuated. On actuation, the compressor 12 releases pressurized hot refrigerant gases to the evaporator 11. In the evaporator, thermal connection between pressurized hot refrigerant gases and froth is established resulting in melting of the froth and formation of warm liquid refrigerant from pressurized hot refrigerant gases. As pressurized hot refrigerant gases are condensed to warm liquid refrigerant in the evaporator 13, the evaporator 13 thus acts as a condenser in the defrosting operation. Thus, the evaporator 13 can also be termed as a hybrid evaporator-condenser. Warm liquid refrigerant from the evaporator 11 are then directed to the condenser 14. The condenser 14 acts as an evaporator during defrosting operation and converts warm liquid refrigerant to refrigerant gases. Thus, the condenser 14 can also be termed as a hybrid condenser-evaporator. Refrigerant gases are then directed to the compressor 12 through reversing valve 13 for the next defrost cycle.

In accordance with one embodiment of the present disclosure, the reversing valve 13 is manually actuated to permit flow of refrigerant in the first refrigerant flow path or the second refrigerant flow path. In accordance with another embodiment of the present disclosure, the reversing valve 13 is automatically actuated at a pre-determined condition by a controller (not illustrated in Figures) to permit flow of refrigerant in the first refrigerant flow path or the second refrigerant flow path. In its operating environment the system begins by hot gas being distributed from compressor 12 to reversing (or four-way valve 13). Four-way or reversing valve 13 is sent instructions from thermostat sensor 05 where to distribute the hot gas depending whether the present invention is in the cooling or defrosting phase. In the cooling phase, the hot gas is distributed to condenser 14 where the hot gas is turned into a liquid. From there, the liquid is distributed to expansion valve 15 which then cools the liquid and sends it to evaporator 11. Water entering evaporator 11 from the bar 01 is cooled using thermal conduction between the water and the cooled liquid within evaporator 11. The cooled water is then circulated back into bar 01 through inlet 02 to travel along the inside of bar 01 maintaining users' drinks cool.

The cooled water exits bar 01 through outlet 03 and temperature sensor 05 then reads the temperature of the water to determine whether the cooling phase can continue or if a defrosting phase is needed depending on whether the freezing point has been reached or how close the temperature is to the freezing point. The freezing point may differ depending on whether water, water with salt, or glycol is circulated through bar 01. If the cooling phase continues the water is then circulated back into evaporator 11 where the water continues to be cooled.

If temperature sensor 05 reads that the water or glycol is too close to freezing or if a user notices frost accumulating in evaporator 11 the system's defrost feature is actuated. The first step in the defrost feature is to deactivate pump 06 so that water does not circulate into evaporator 11. Then, the hot gas distributed from compressor 12 is sent to reversing valve 13 which this time directs the hot gas to evaporator 11 instead of condenser 14 so that it can melt the accumulated frost therein. From there the hot gas becomes a liquid since evaporator 11 is acting like a condenser. The liquid is passed through the expansion valve 15, which is a biflow expansion valve and into condenser 14 which now acts as an evaporator. From there, the liquid becomes a vapor that is suctioned back to reversing valve 13 and then to compressor 12.

The periodical maintenance or replacement of components of the liquid cooling section 10 or the refrigeration system section 20 of the liquid cooler 100 of the present disclosure is easy to handle and portable from one place to another because the refrigerating system section 20 is easily separated from the liquid cooling section 10 as compared to components of conventional liquid coolers in which the refrigeration system and the liquid to be cooled are enclosed in a single inseparable enclosure. The ease of handling is due to handling less weight of either the liquid cooling section 10 or the refrigeration system section 20 which requires less handling time and labor and hence is a less costly process.

In accordance with one embodiment of the present disclosure, the liquid cooler 100 is electrically powered through power mains to maintain cooled liquid at pre-determine temperature. In accordance with another embodiment of the present disclosure, the liquid cooler 100 is electrically powered by using a power storage device such as a battery to maintain the cooled liquid at pre-determine temperature in case of power failure through the power mains. The present invention can be used with a cooler instead of a bar to circulate cooled water through the perimeter walls of the cooler to keep the beverages and/or food therein cool.

In the preceding specification, the present disclosure is described with reference to the specific embodiments. However, it will be apparent to a person with ordinary skill in the art that various modifications and changes can be made, without departing from the scope of the present disclosure. Accordingly, the specification and figures are to be regarded as illustrative examples of the present disclosure, rather than in restrictive sense. All such possible modifications are intended to be included within the scope of present disclosure.

What is claimed is:

1. A system to cool beverages comprising: a compressor, a condenser, an expansion valve, an evaporator, a pump, a temperature sensor, a bar, inlet and outlet pipes inside said bar that allow a cooled liquid to be circulated, a divider extending longitudinally along the center of said bar, said cooled liquid circulating around said divider, a plurality of beverage holders mounted within said divider at predetermined depth so that cooled liquid can cooperatively cool a beverage within said beverage holder.

2. The system subject of claim 1 wherein said pump is deactivated and then a four-way valve distributes said hot gas to said evaporator when said liquid circulating within said bar reaches a predetermined temperature or when frost accumulates within said evaporator.

3. The system subject of claim 1 wherein said system includes a filter dryer is included within the system to prevent debris from entering therein.

4. The system subject of claim 1 wherein at least one coupler is used to connect said inlet and outlet pipes to said evaporator.

5. The system subject of claim 1 wherein said liquid circulated within said bar is glycol.

6. The system subject of claim 1 wherein said liquid circulated within said bar is water with salt.

7. The system subject of claim 1 wherein said liquid is circulated through a cooler instead of a bar.

8. The system subject of claim 1 having a suction hose from said four-way valve to said compressor, a distribution hose from said compressor to said four-way valve, a suction hose from said evaporator to said four-way valve, a distribution hose from said four-way valve to said condenser, a distribution hose from said four-way valve to said evaporator, a distribution valve from said expansion valve to said evaporator, a distribution valve from said evaporator to said expansion valve, a distribution valve from said expansion valve to said condenser, and a suction hose from said condenser to said four-way valve.

9. The system subject of claim 1 wherein said expansion valve is a biflow expansion valve.

10. The system subject of claim 1 said bar includes at least one cavity along said divider, said cavity being an effective depth to allow a bottle to be positioned therein and at a depth sufficient for the thermal conduction from the cooled liquid circulated through the inlet and outlet pipes therein to cool said bottle.

11. The system subject of claim 1 wherein said compressor, temperature sensor, and pump are powered using a battery.

12. The system subject of claim 1 wherein said compressor, temperature sensor, and pump are powered using alternating current.

13. The system of claim 1 wherein said bar includes first and second end said divider having a first and second distal end, said dividers first distal end extending to make contact with said bars first side said divider second distal end extending towards said bars second end without making contact.

* * * * *